(12) United States Patent
Tisch

(10) Patent No.: US 12,069,447 B2
(45) Date of Patent: *Aug. 20, 2024

(54) BEAMFORMING FOR WIND NOISE OPTIMIZED MICROPHONE PLACEMENTS

(71) Applicant: GoPro, Inc., San Mateo, CA (US)

(72) Inventor: Erich Tisch, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,066

(22) Filed: Apr. 20, 2023

(65) Prior Publication Data
US 2023/0262385 A1 Aug. 17, 2023

Related U.S. Application Data

(63) Continuation of application No. 17/850,631, filed on Jun. 27, 2022, now Pat. No. 11,665,475, which is a continuation of application No. 16/991,748, filed on Aug. 12, 2020, now Pat. No. 11,405,722.

(60) Provisional application No. 62/901,505, filed on Sep. 17, 2019.

(51) Int. Cl.
*H04R 3/00* (2006.01)
*H04R 3/12* (2006.01)

(52) U.S. Cl.
CPC ............... *H04R 3/005* (2013.01); *H04R 3/12* (2013.01); *H04R 2203/12* (2013.01); *H04R 2410/01* (2013.01); *H04R 2410/07* (2013.01); *H04R 2430/23* (2013.01)

(58) Field of Classification Search
CPC .......... H04R 1/406; H04R 1/04; H04R 3/005; H04R 3/12; H04R 29/005; H04R 2203/12; H04R 2410/01; H04R 2410/07; H04R 2430/03; H04R 2499/11; H04S 1/007; H04S 2400/15
USPC ............. 381/71.14, 91, 94.2, 94.3, 303, 320
See application file for complete search history.

(56) References Cited

U.S. PATENT DOCUMENTS

| 11,405,722 | B2 | 8/2022 | Tisch | |
|---|---|---|---|---|
| 2004/0086137 | A1* | 5/2004 | Yu | G10L 21/0208 381/71.11 |
| 2005/0140810 | A1* | 6/2005 | Ozawa | H04R 3/005 348/333.02 |
| 2018/0084215 | A1* | 3/2018 | Jing | H04S 7/305 |
| 2018/0167581 | A1* | 6/2018 | Goesnar | H04N 7/142 |
| 2020/0382864 | A1* | 12/2020 | Laaksonen | H04S 7/301 |

(Continued)

*Primary Examiner* — William A Jerez Lora
(74) *Attorney, Agent, or Firm* — Young Basile Hanlon & MacFarlane, P.C.

(57) ABSTRACT

An image capture device with beamforming for wind noise optimized microphone placements is described. The image capture device includes a front facing microphone configured to capture an audio signal. The front facing microphone co-located with at least one optical component. The image capture device further includes at least one non-front facing microphone configured to capture an audio signal. The image capture device further includes a processor configured to generate a forward facing beam using the audio signal captured by the front facing microphone and the audio signal captured by the at least one non-front facing microphone, generate an omni beam using the audio signal captured by the at least one non-front facing microphone, and output an audio signal based on the forward facing beam and the omni beam.

20 Claims, 13 Drawing Sheets

(56) References Cited

U.S. PATENT DOCUMENTS

2021/0084408 A1\* 3/2021 Tisch ................... H04R 3/005
2022/0329939 A1 10/2022 Tisch \* cited by examiner

BEAMFORMING FOR WIND NOISE OPTIMIZED MICROPHONE PLACEMENTS

CROSS-REFERENCE TO RELATED APPLICATION

This application is a continuation of U.S. application Ser. No. 17/850,631, filed Jun. 27, 2022, which is a continuation of U.S. application Ser. No. 16/991,748, filed Aug. 12, 2020, now U.S. Pat. No. 11,405,722, which claims priority to and the benefit of U.S. Provisional Patent Application No. 62/901,505, filed Sep. 17, 2019, each of which is incorporated herein by reference in its entirety.

TECHNICAL FIELD

This disclosure relates to audio processing for image capture devices.

BACKGROUND

Image capture devices, such as cameras, may capture content as images or video along with audio. When recording audio events in a dynamic environment for playback at a later time, it is important to process the audio signals such that when the signals are reproduced by the playback device, they closely resemble the audio event as experienced by the listener. Beamforming techniques have been applied to audio signals recorded with microphones to more accurately reproduce the spatial characteristics of audio signals during playback.

However, placement of the microphones for optimizing wind performance of the image capture device is non-optimal for audio recording. These non-optimal locations create a variety of problems for traditional beamforming techniques.

SUMMARY

Disclosed herein are implementations of beamforming for wind noise optimized microphone placements. In an implementation, an image capture device with beamforming for wind noise optimized microphone placements includes a front facing microphone configured to capture an audio signal, where the front facing microphone co-located with at least one optical component, and at least one non-front facing microphone configured to capture an audio signal. The image capture device further includes a processor configured to generate a forward facing beam using the audio signal captured by the front facing microphone and the audio signal captured by the at least one non-front facing microphone, generate an omni beam using the audio signal captured by the at least one non-front facing microphone, and output an audio signal based on the forward facing beam and the omni beam.

In an implementation, the at least one non-front facing microphone is a side microphone. In an implementation, the processor is further configured to apply tuned beamforming parameters to the audio signal captured by the front facing microphone and the audio signal captured by the at least one non-front facing microphone to account for body shadowing and delay effects. In an implementation, the processor is further configured to apply tuned beamforming parameters to the audio signal captured by the at least one non-front facing microphone to account for body shadowing and delay effects. In an implementation, stereo audio is generated from the output audio signal. In an implementation, the front facing microphone and the least one non-front facing microphone are relationally offset from an optical axis of the at least one optical component. In an implementation, the front facing microphone and the least one non-front facing microphone are angularly offset from an optical axis of the at least one optical component.

In an implementation, an image capture device with beamforming for wind noise optimized microphone placements includes a microphone configured to capture an audio signal, the microphone co-located with at least one optical component, at least another microphone configured to capture an audio signal, and a processor. The processor is configured to generate an audio source facing beam using the audio signal captured by the first microphone and the audio signal captured by the at least another microphone, generate a non-rear facing beam using the audio signal captured by at least the at least another microphone, where the non-rear facing beam leans more toward an audio source than away from the audio source, and output an audio signal based on the audio source facing beam and the non-rear facing beam.

In an implementation, the microphone is facing the audio source and the at least another microphone is a side microphone. In an implementation, the processor is further configured to apply tuned beamforming parameters to the audio signal captured by the microphone and the audio signal captured by the at least another microphone to account for body shadowing and delay effects. In an implementation, the processor is further configured to apply tuned beamforming parameters to the audio signal captured by the at least another microphone to account for body shadowing and delay effects. In an implementation, the non-rear facing beam is generated from the audio signal captured by the least another microphone and the audio signal captured by the microphone. In an implementation, the processor is further configured to apply tuned beamforming parameters to the audio signal captured by the microphone and the audio signal captured by the at least another microphone to account for body shadowing effects and non-application of delay effects. In an implementation, stereo audio is generated from the output audio signal. In an implementation, the microphone and the least another microphone are relationally offset from an optical axis of the at least one optical component. In an implementation, the microphone and the least another microphone are angularly offset from an optical axis of the at least one optical component.

In an implementation, a method for beamforming for wind noise optimized microphone placements includes capturing an audio signal from an audio source facing microphone on an image capture device, capturing an audio signal from another microphone on the image capture device, the microphone and the other microphone being angularly offset from an optical axis of an optical component on the image capture device, generating an audio source facing beam from the audio signal captured by the an audio source facing microphone and the audio signal of the other microphone, generating a non-rear facing beam from at least the audio signal captured by the other microphone, wherein the non-rear facing beam leans more toward an audio source than away from the audio source, and outputting an audio signal based on the audio source facing beam and the non-rear facing beam.

In an implementation, the non-rear facing beam is an omni beam generated from the audio signal captured by the other microphone. In an implementation, the non-rear facing is generated from the audio signal captured by the audio source facing microphone and the audio signal captured by the other microphone without application of delay effects. In an implementation, the other microphone is a side microphone.

In an implementation, an image capture device with beamforming for wind noise optimized microphone placements includes a front facing microphone configured to capture an audio signal, the front facing microphone co-located with at least one optical component, and at least one non-front facing microphone configured to capture an audio signal, and a processor. The processor configured to generate a forward facing beam using the audio signal captured by the front facing microphone and the audio signal captured by the at least one non-front facing microphone, generate a non-rear facing beam using the audio signal captured by the front facing microphone and the audio signal captured by the at least one non-front facing microphone, and output an output audio signal based on the forward facing beam and the non-rear facing beam.

In an implementation, the at least one non-front facing microphone is a side microphone. In an implementation, for the forward facing beam generation, the processor further configured to apply tuned beamforming parameters to the audio signal captured by the front facing microphone to account for body shadowing and delay effects. In an implementation, for the non-rear facing beam generation, the processor further configured to apply broadside beamforming parameters to the audio signal captured by the front facing microphone and the audio signal captured by the at least one non-front facing microphone to account for body shadowing effects. In an implementation, for the non-rear facing beam generation, the processor further configured to apply tuned beamforming parameters to the audio signal captured by the front facing microphone and the audio signal captured by the at least one non-front facing microphone to account for body shadowing effects, wherein the tuned beamforming parameters forego application of delays to the audio signal captured by the front facing microphone and the audio signal captured by the at least one non-front facing microphone. In an implementation, the front facing microphone and the least one non-front facing microphone are relationally offset from an optical axis of the at least one optical component. In an implementation, the front facing microphone and the least one non-front facing microphone are angularly offset from an optical axis of the at least one optical component.

In an implementation, an image capture device with beamforming for wind noise optimized microphone placements includes a microphone configured to capture an audio signal, the microphone co-located with at least one optical component, another microphone configured to capture an audio signal, and a processor. The processor configured to generate an audio source facing beam using the audio signal captured by the microphone and the audio signal captured by the another microphone, generate a non-rear facing beam using the audio signal captured by the another microphone, wherein the non-rear facing beam leans more toward an audio source than away from the audio source, and output an output audio signal based on the audio source facing beam and the non-rear facing beam.

In an implementation, the microphone is facing the audio source and the another microphone is a side microphone. In an implementation, the audio source facing beam generation, the processor further configured to apply tuned beamforming parameters to the audio signal captured by the microphone and the audio signal captured by the another microphone to account for body shadowing and delay effects. In an implementation, for the non-rear facing beam generation, the processor further configured to apply broadside beamforming parameters to the audio signal captured by the microphone and the audio signal captured by the another microphone to account for body shadowing effects. In an implementation, the non-rear facing beam is generated from non-delayed versions of the audio signal captured by the microphone and the audio signal captured by the another microphone. In an implementation, for the non-rear facing beam generation, the processor further configured to apply tuned beamforming parameters to the audio signal captured by the microphone and the audio signal captured by the another microphone to account for body shadowing, wherein the tuned beamforming parameters forego application of delays to the audio signal captured by the microphone and the audio signal captured by the another microphone. In an implementation, for the non-rear facing beam generation, the processor further configured to apply tuned beamforming parameters to the audio signal captured by the microphone and the audio signal captured by the another microphone to account for body shadowing effects and non-application of delay effects. In an implementation, stereo audio is generated from the output audio signal. In an implementation, the microphone and the another microphone are relationally offset from an optical axis of the at least one optical component. In an implementation, the microphone and the another microphone are angularly offset from an optical axis of the at least one optical component.

In an implementation, a method for beamforming for wind noise optimized microphone placements includes capturing an audio signal from a front facing microphone on an image capture device, capturing an audio signal from at least one non-front facing microphone on the image capture device, generating a forward facing beam from the audio signal captured by the front facing microphone and the audio signal captured by the non-front facing microphone, generating a non-rear facing beam from at least the audio signal captured by the front facing microphone and the audio signal captured by the at least one non-front facing microphone, and outputting an output audio signal based on the forward facing beam and the non-rear facing beam.

In an implementation, for the non-rear facing beam generation, further including applying broadside beamforming parameters to the audio signal captured by the front facing microphone and the audio signal captured by the at least one non-front facing microphone to account for body shadowing effects. In an implementation, for the non-rear facing beam generation, further including applying tuned beamforming parameters to the audio signal captured by the front facing microphone and the audio signal captured by the at least one non-front facing microphone to account for body shadowing effects, wherein the tuned beamforming parameters forego application of delays to the audio signal captured by the front facing microphone and the audio signal captured by the at least one non-front facing microphone.

In an implementation, an image capture device includes a microphone configured to capture an audio signal, another microphone configured to capture another audio signal, and a processor. The processor is configured to generate a first beam based on the audio signal captured by the microphone and the other audio signal captured by the other microphone, wherein the first beam is co-oriented with at least one optical component, wherein beamforming parameters are applied to the audio signal captured by the microphone, and wherein the beamforming parameters account for body shadowing effects, generate a second beam based on the other audio signal captured by the other microphone; and output an output audio signal based on the first beam and the second beam.

In an implementation, the other microphone is a side microphone. In an implementation, the other microphone is a top microphone. In an implementation, the microphone and the least another microphone are angularly offset from an optical axis of the at least one optical component. In an implementation, the beamforming parameters account for delay effects. In an implementation, to generate the second beam, the processor is further configured to apply beamforming parameters to the other audio signal captured by the other microphone. In an implementation, the second beam is an omni beam. In an implementation, the microphone and the other microphone are relationally offset from an optical axis of the at least one optical component. In an implementation, the second beam is generated based on the audio signal captured by the microphone and the other audio signal captured by the other microphone. In an implementation, to generate the second beam, the processor is further configured to apply beamforming parameters to the audio signal captured by the microphone and the other audio signal captured by the other microphone. In an implementation, the second beam is a cardioid beam.

In an implementation, a method for beamforming for wind noise optimized microphone placements, the method includes generating a first beam based on an audio signal captured by a microphone on an image capture device and an audio signal captured by at least another microphone on the image capture device, wherein the first beam is co-oriented with at least one optical component; wherein beamforming parameters are applied to the audio signal captured by the microphone, and wherein the beamforming parameters account for body shadowing effects; generating a second beam based on the audio signal captured by at least the at least another microphone; and outputting an output audio signal based on the first beam and the second beam.

In an implementation, the at least another microphone is a side microphone. In an implementation, the microphone and the least another microphone are relationally offset from an optical axis of the at least one optical component. In an implementation, the beamforming parameters account for delay effects. In an implementation, the generating a second beam further comprises applying beamforming parameters to the audio signal captured by the at least another microphone. In an implementation, the second beam is generated based on the audio signal captured by the microphone and the audio signal captured by at least the at least another microphone. In an implementation, the generating the first beam further comprises applying beamforming parameters to the audio signal captured by the microphone and the audio signal captured by the at least another microphone. In an implementation, the microphone and the least another microphone are angularly offset from an optical axis of the at least one optical component.

In an implementation, an image capture device includes a microphone configured to capture an audio signal; another microphone configured to capture another audio signal, and a processor. The processor configured to generate an audio source facing beam based on the audio signal captured by the microphone and the other audio signal captured by the other microphone, wherein the audio source facing beam is co-oriented with at least one optical component, beamforming parameters are applied to the audio signal captured by the microphone, and wherein the beamforming parameters account for body shadowing effects, generate an audio source leaning beam using the other audio signal captured by the other microphone, and output an output audio signal based on the audio source facing beam and the audio source leaning beam.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
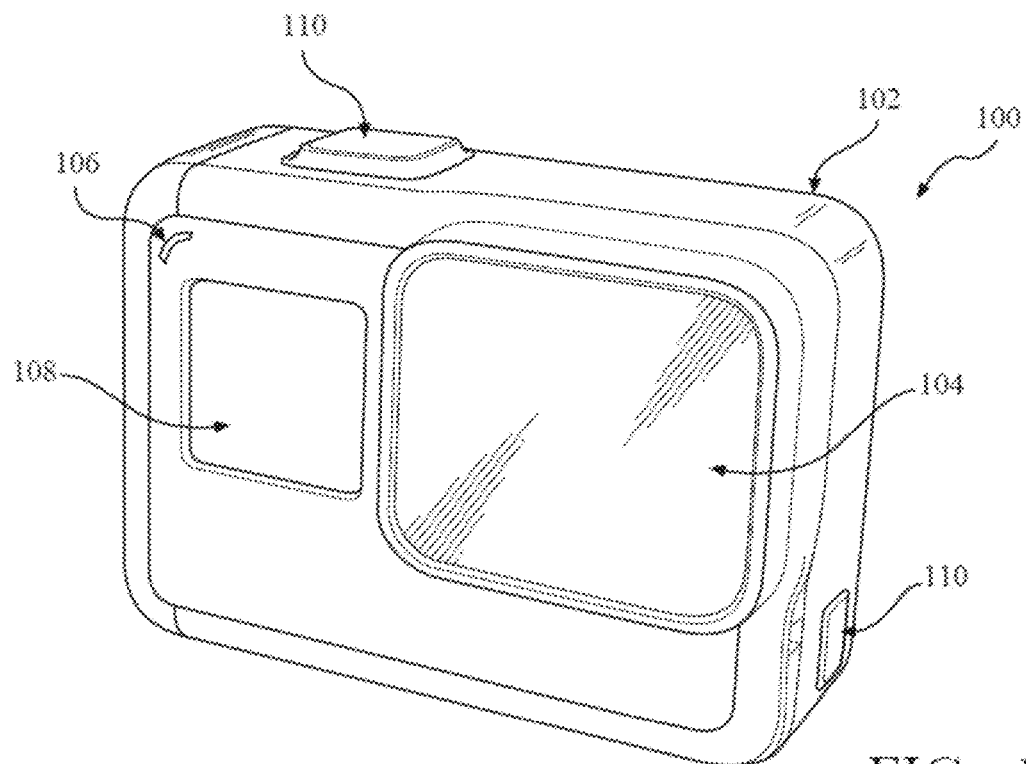
FIGS. 1A-D are isometric views of an example of an image capture device.

Image capture devices, such as cameras, may capture content as images or video along with audio. The image capture devices have multiple microphones which capture audio signals. These raw audio signals are processed by applying gain and using audio compressors, for example, to make the audio listenable. Image capture devices are however subject to various environmental conditions and scenarios including, for example, wind conditions which affect the audio signals and consequently the listenability of the audio. Placement of microphones to optimize performance in wind conditions using beamforming techniques applied to non-optimized microphone placement places limitations on the ability to create stereo audio signals.

Implementations of this disclosure address problems such as these using beamforming for wind noise optimized microphone placement systems and techniques. In an implementation, an image capture device includes multiple microphones including a front facing microphone, where the front facing microphone is co-located with an optical component for capturing images, videos, and the like. In an implementation, the front facing microphone provides superior or significant wind performance as compared to other microphone placements due to the creation of a stagnant pressure region. That is, placement of a microphone along the direction of the optical axis and same view of the optical component or lens is beneficial to operation of the image capture device in wind scenarios.

Audio signals are captured by the multiple microphones. A forward facing beam is generated for the front facing microphone using all captured audio signals using beamforming techniques. A non-rear facing beam is generated for each of the non-front facing microphones using at least an associated captured audio signal. In an implementation, non-rear facing refers to a beam leaning or facing more towards an audio source than away from the audio source. That is, a beam forming axis is directed more towards an audio source than away from the audio source. In an implementation, the non-rear facing beam is an omni beam generated from a captured audio signal associated with the non-front facing microphone. In an implementation, the non-rear facing beam is generated using non-delayed captured audio signals. In an implementation, the non-rear facing beam is generated using the appropriate captured audio signals via broadside beamforming techniques.

The implementations of this disclosure are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
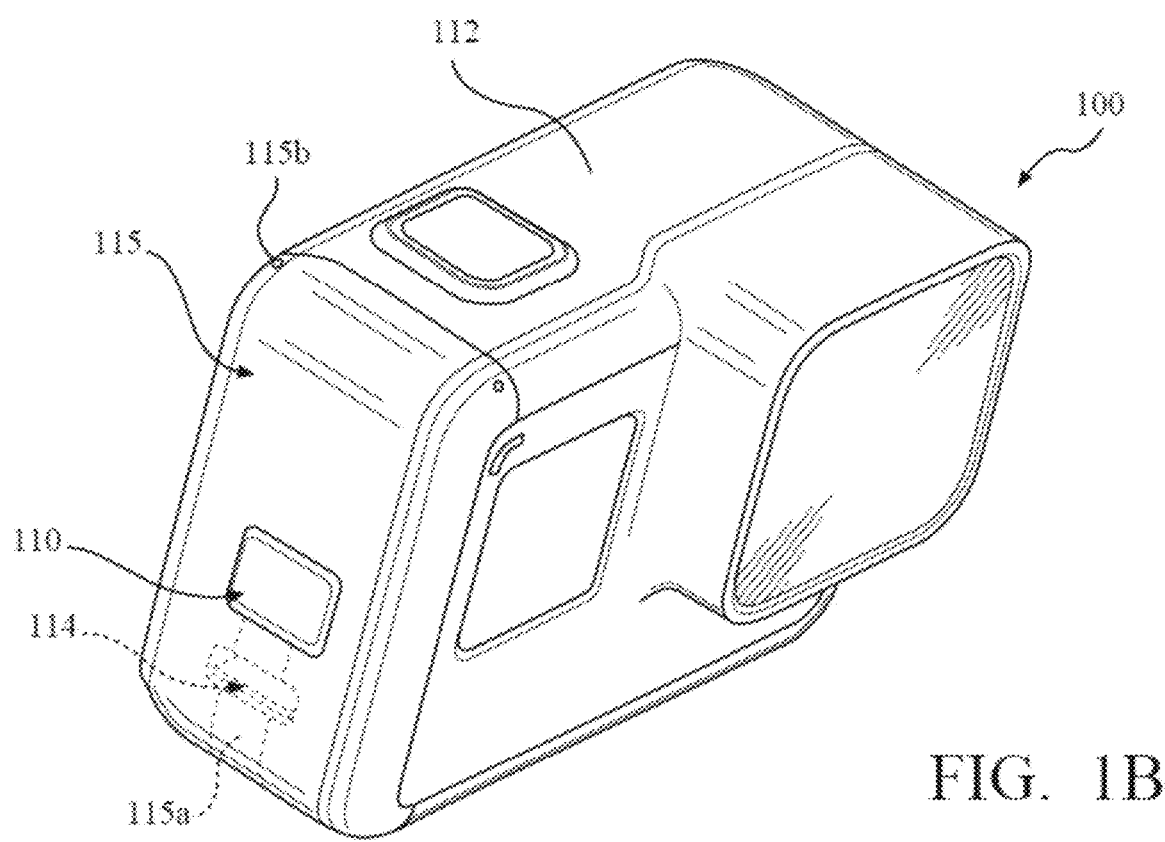
Figure 1C:
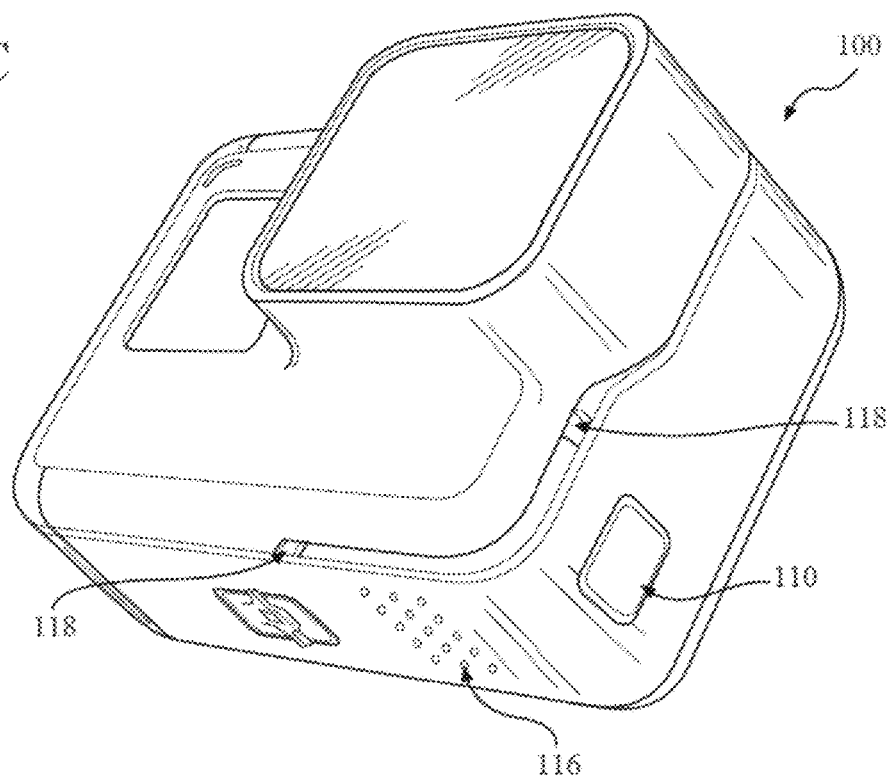
Figure 1D:
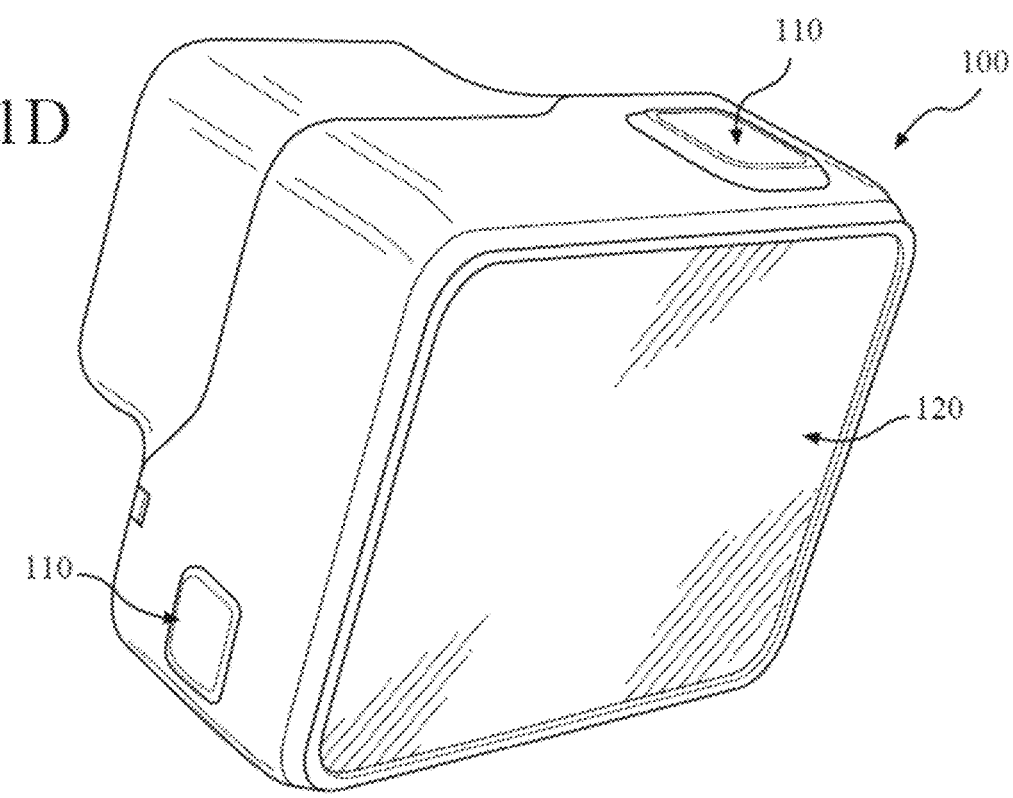

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
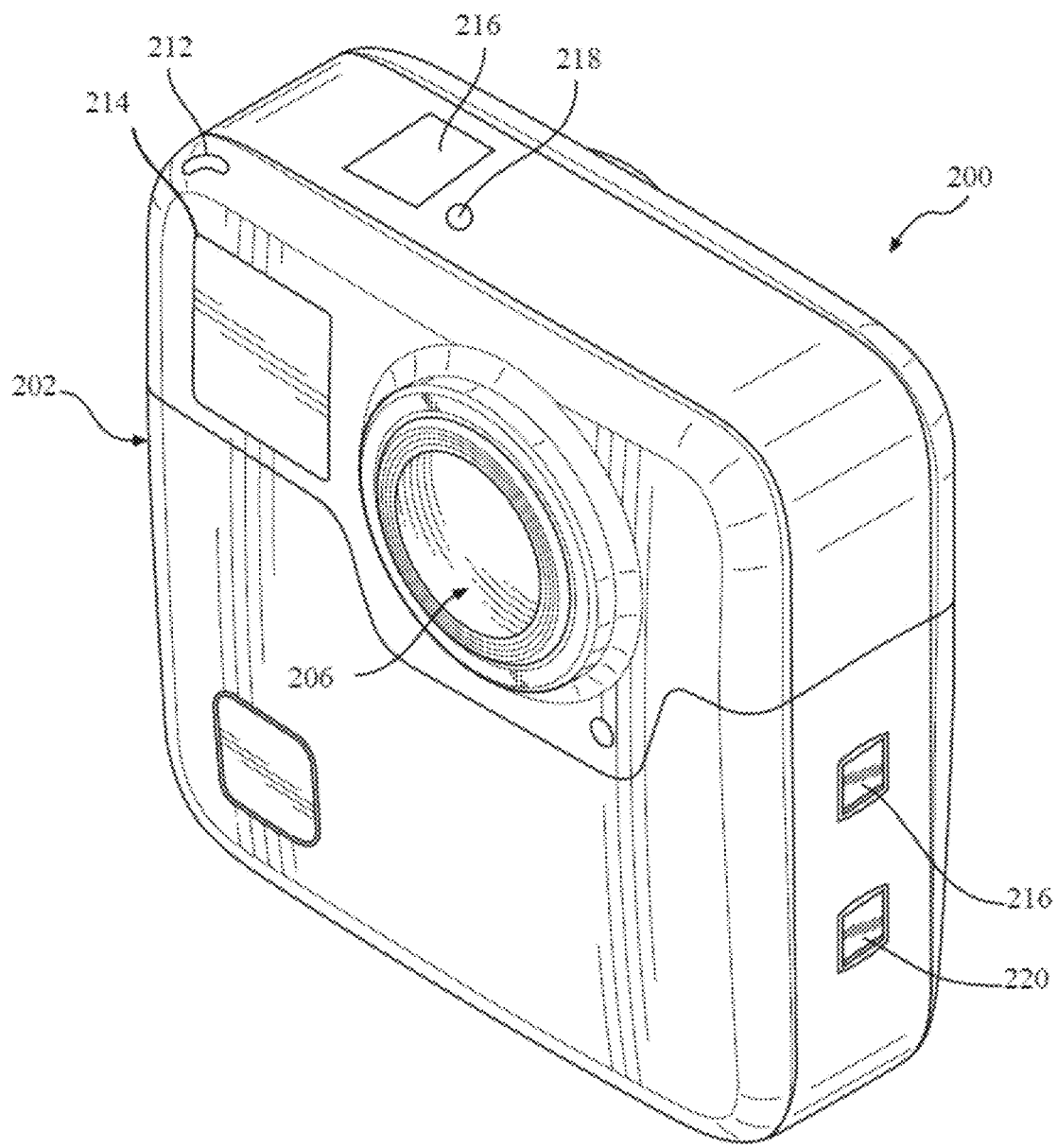
FIGS. 2A-B are isometric views of another example of an image capture device.
Figure 2B:
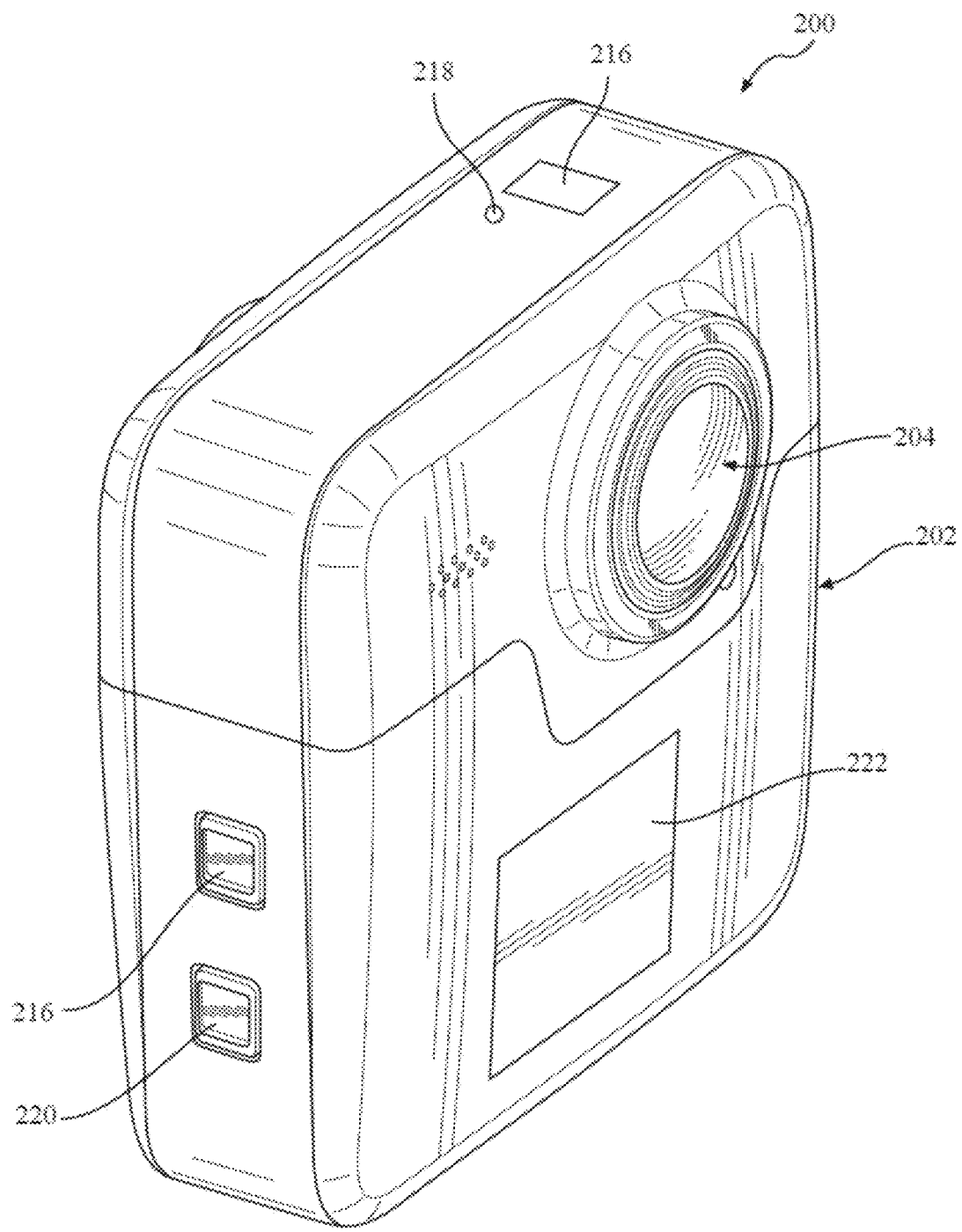

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
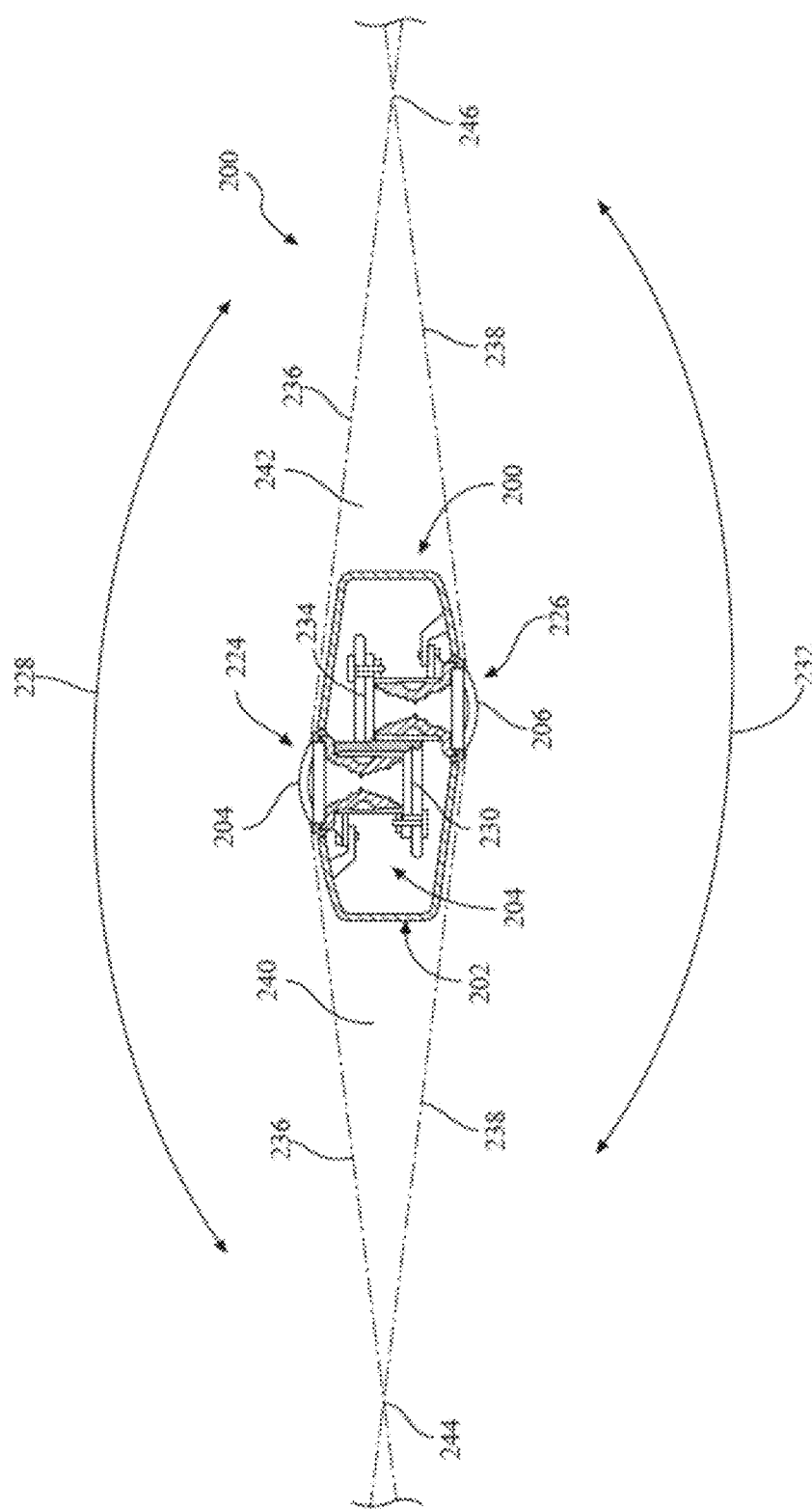
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 3B:
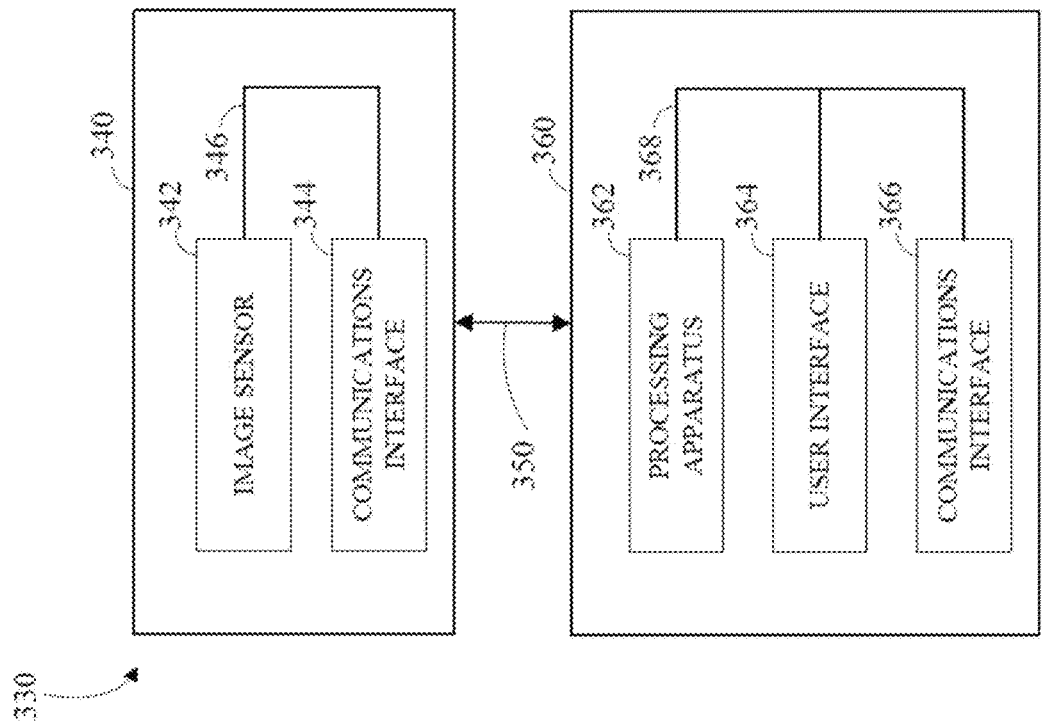
FIGS. 3A-B are block diagrams of examples of image capture systems.
Figure 3A:
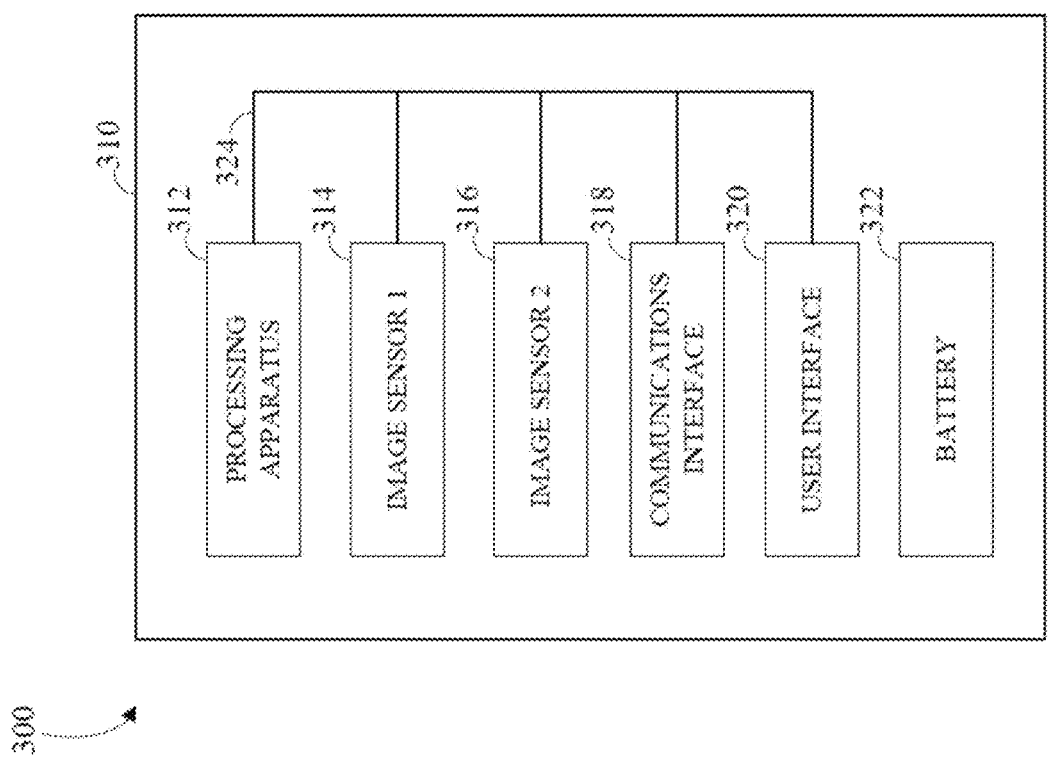

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 7:
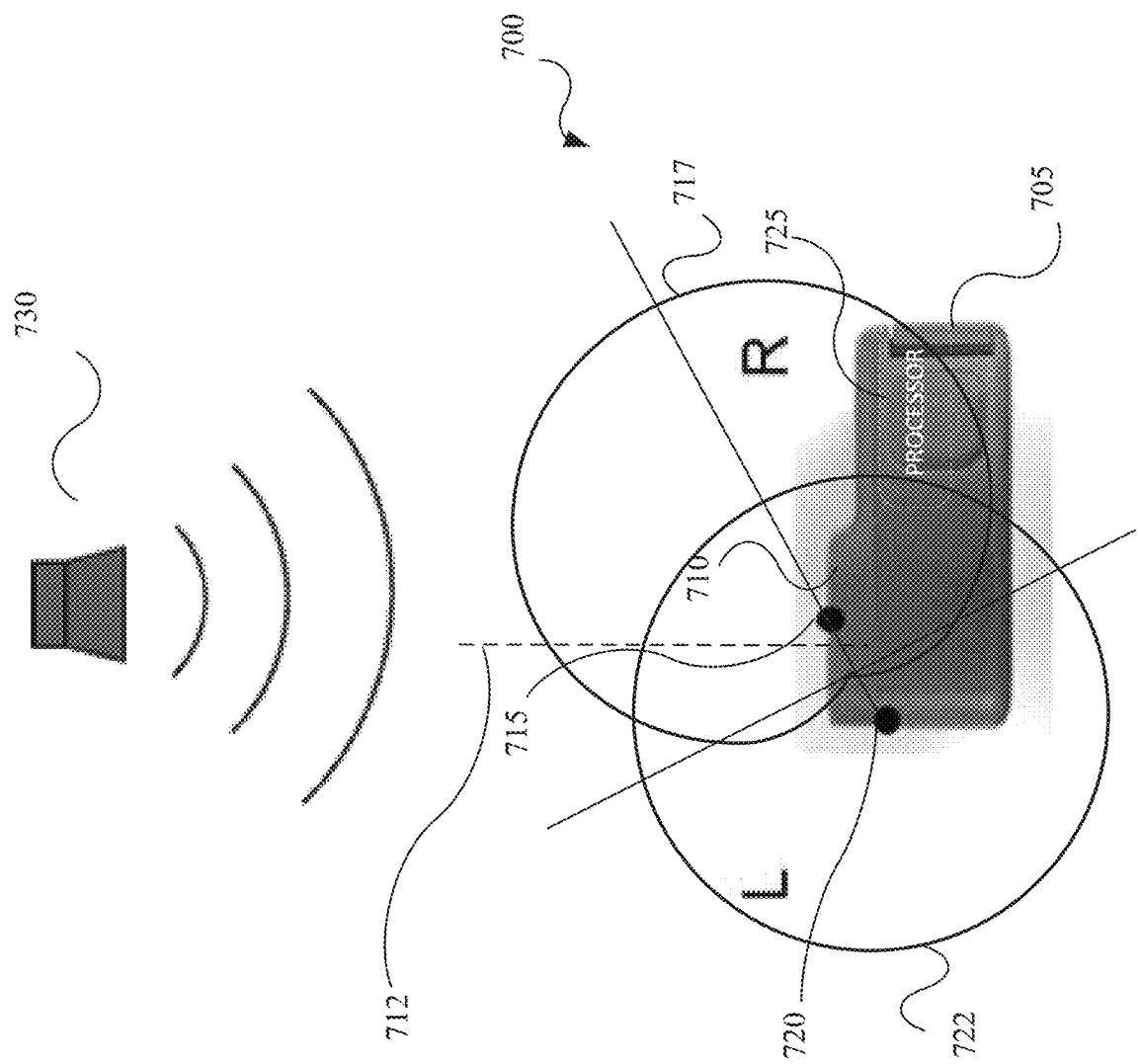
FIG. 7 is a top view of a block diagram of an example of an image capture device with optimal microphone placements and non-rear facing beamforming.
Figure 8:
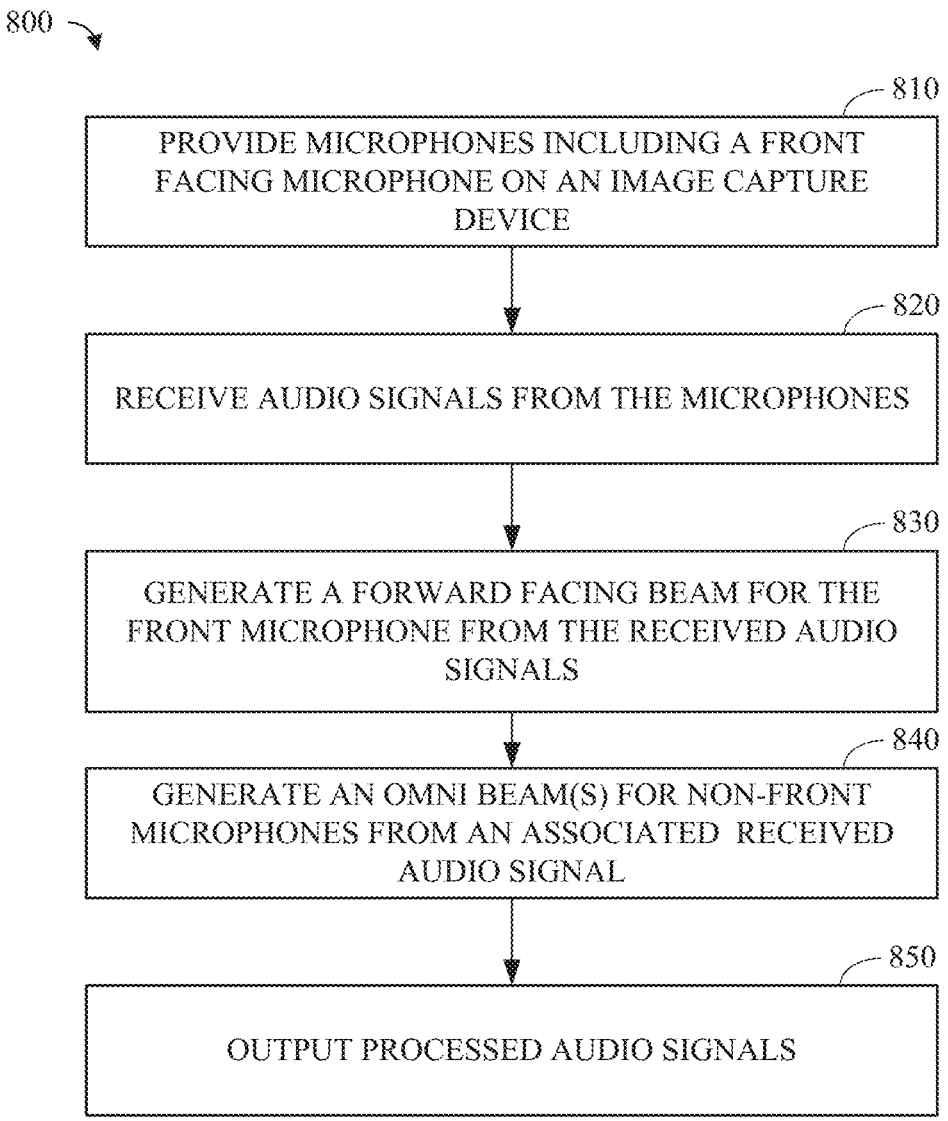
FIG. 8 is a flowchart showing an example of a technique for beamforming for wind noise optimized microphone placements.
Figure 9:
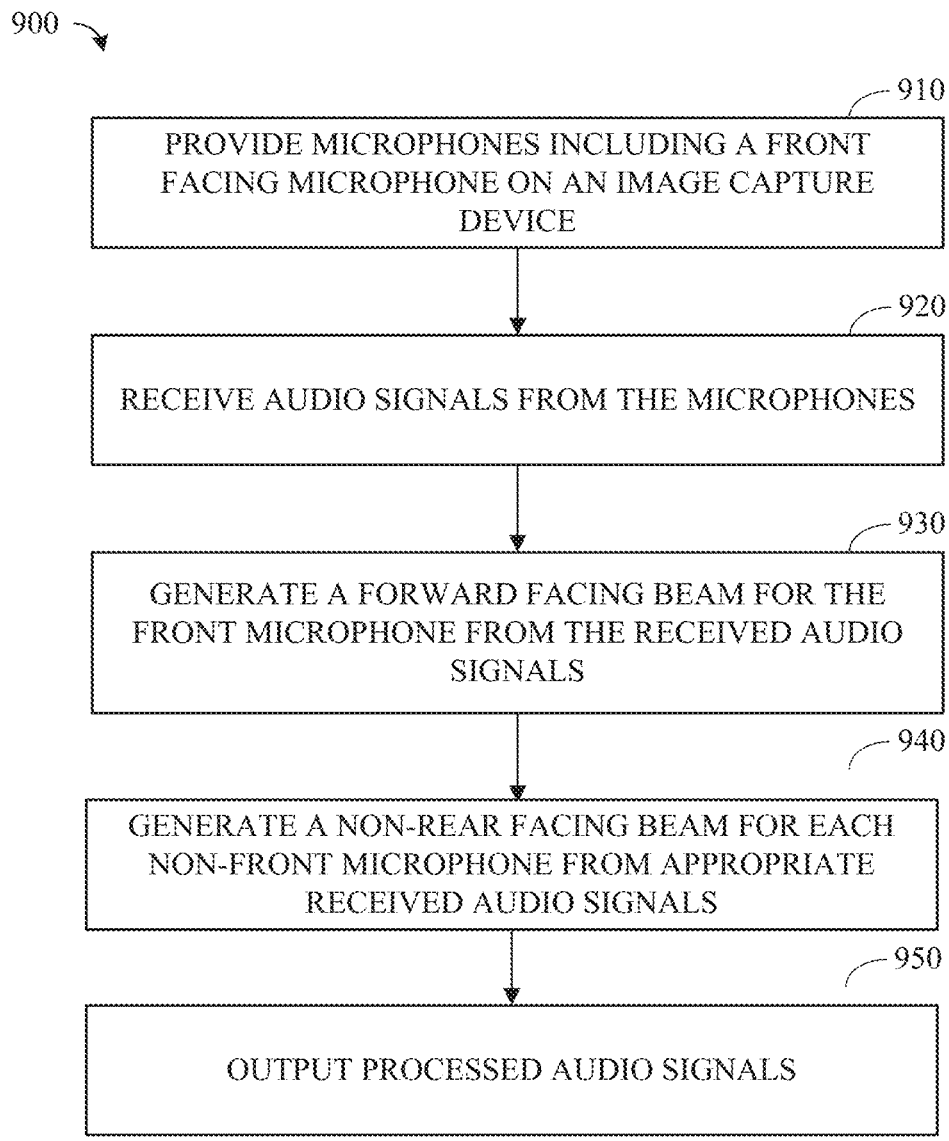
FIG. 9 is a flowchart showing an example of a technique for beamforming for wind noise optimized microphone placements.

The image capture system 300 may be used to implement some or all of the techniques described in this disclosure, such as the techniques for beamforming for wind noise optimized microphone placement as described in FIGS. 7-9.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure, such as the techniques for beamforming for wind noise optimized microphone placement as described in FIGS. 7-9.

Figure 4B:
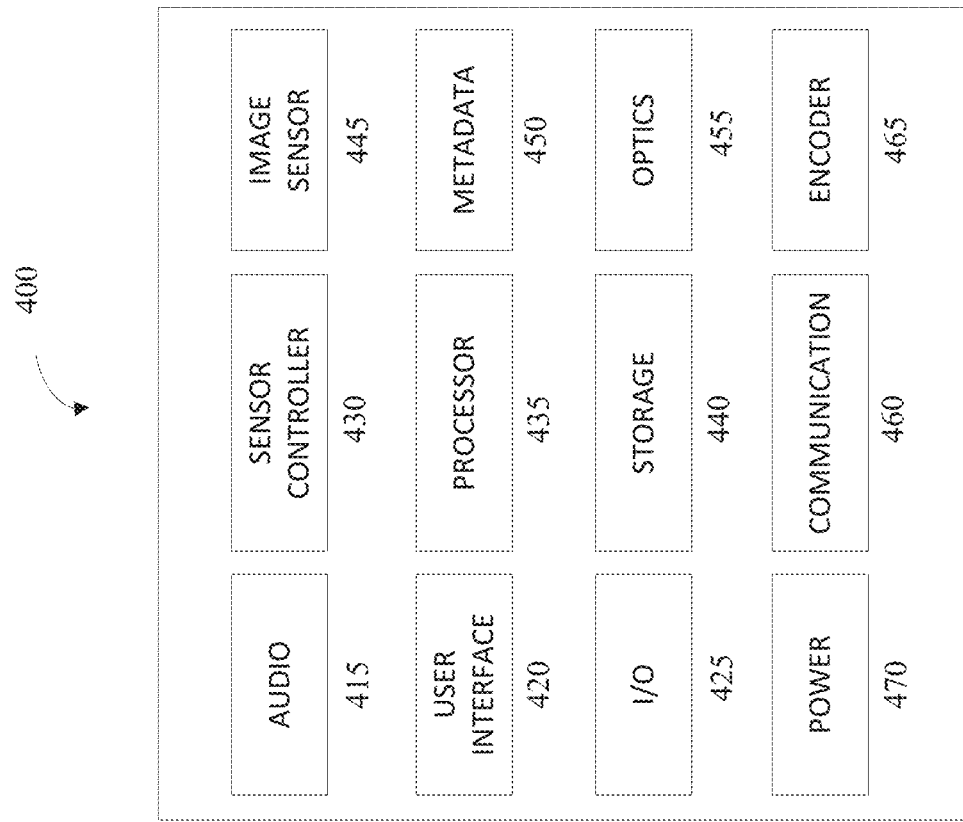
FIGS. 4A-B are a perspective view and a schematic representation of an image capture device.
Figure 4A:
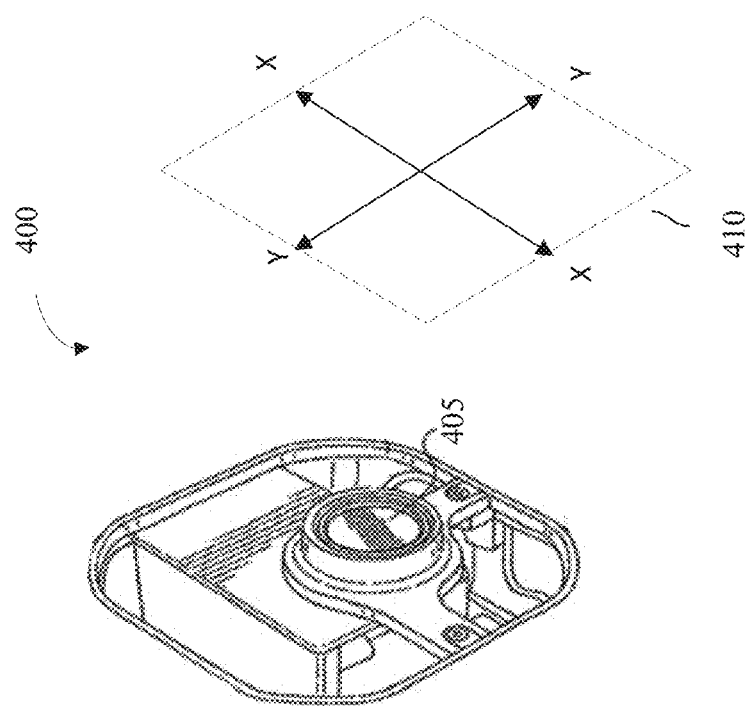

FIG. 4A is a perspective view of another example of an image capture device 400 together with an associated field-of-view and FIG. 4B is a schematic representation of the image capture device 400. The image capture device 400 includes one or more optical components or elements 405 with an associated field-of-view 410 that extends, for example, 90° in a lateral dimension X-X and 120° in a longitudinal dimension Y-Y. Dependent upon the capabilities of the particular optical component(s) 405, however, the extent of the field-of-view 410 may be varied (i.e., increased or decreased) in the lateral dimension or the longitudinal dimension. Suitable optical component(s) 405 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, spherical lenses, and perspective control lenses. In some image capture devices, multiple, overlapping fields of view are employed to increase the capability of the device, for example, by including two or more optical elements. For example, a first fisheye image may be a round or elliptical image, and may be transformed into a first rectangular image; a second fisheye image may be a round or elliptical image, and may be transformed into a second rectangular image; and the first and second rectangular images may be arranged side-by-side, which may include overlapping, and stitched together to form the equirectangular planar image.

As seen in FIG. 4A in addition to the optical component(s) 405, the image capture device 400 may further include an audio component 415, a user interface (UI) unit 420, an input/output (I/O) unit 425, a sensor controller 430, a processor 435, an electronic storage unit 440, an image sensor 445, a metadata unit 450, an optics unit 455, a communication unit 460, an encoder 465, and power system 470. Suitable examples of the image sensor 445 may include a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

During the processing of images, it is envisioned that the processor 435 may beamform for wind noise optimized microphone placements. The processor 435 may implement some or all of the techniques described in this disclosure such as the techniques for beamforming for wind noise optimized microphone placement as described in FIGS. 7-9.

Figure 5:
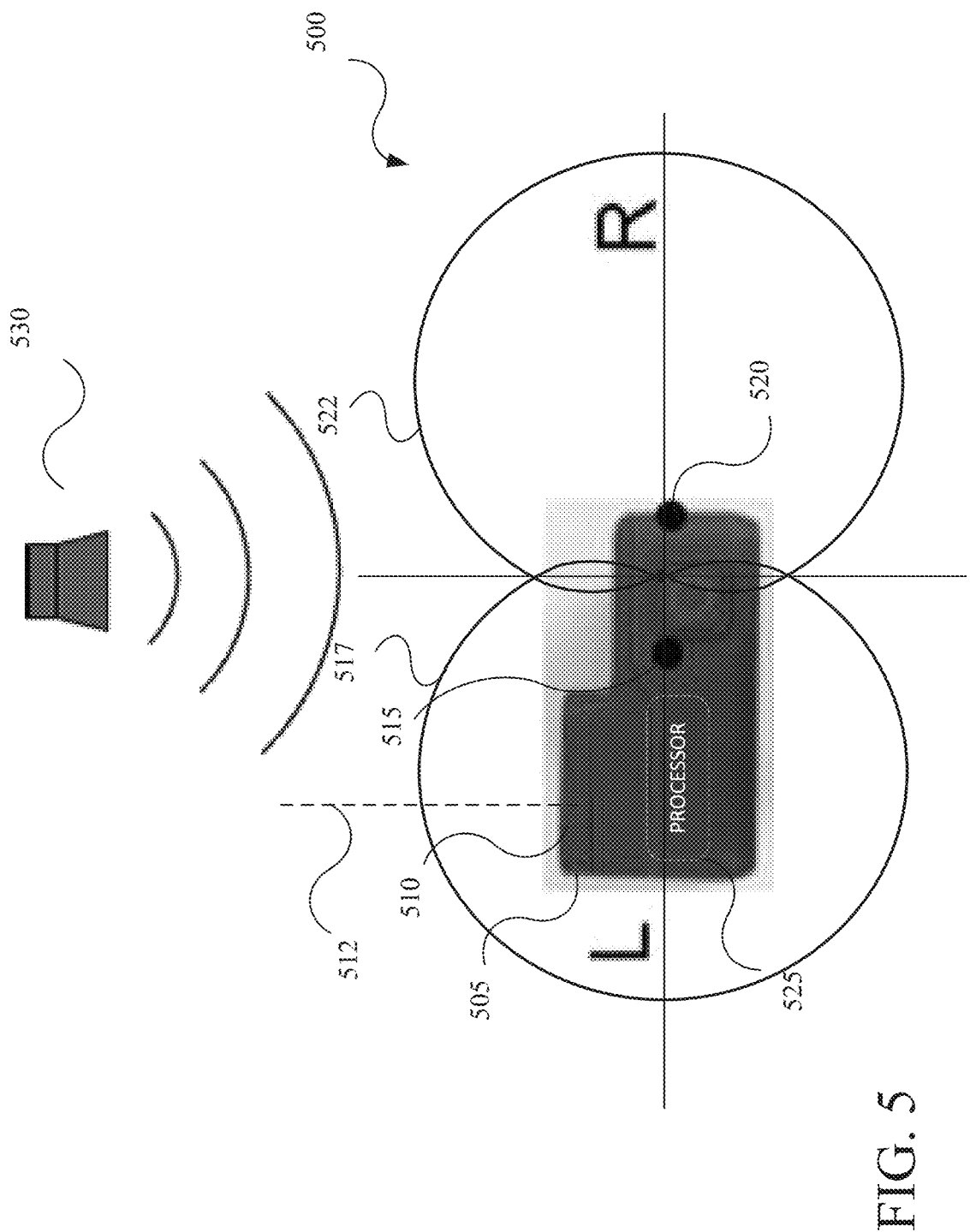
FIG. 5 is a top view of a block diagram of an example of an image capture device with non-optimal microphone placements.

FIG. 5 is a top view of a block diagram of an example of an image capture device 500 with non-optimal microphone placements. The image capture device 500 includes one or more optical components 510 structured on the body 505, a top microphone 515 internal to and structured on the body 505, a side microphone 520 internal to and structured on the body 505, and a processor 525 internal to the body 505. The image capture device 500 may include any or all features and/or characteristics described with respect to FIGS. 1-4B. Although shown as a single element, in alternate embodiments, the number of each element may be varied without departing from the scope of the present disclosure.

The one or more optical components 510 may include any or all features and/or characteristics described with respect to FIGS. 1-4. For example, the one or more optical components 510 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, perspective control lenses, and/or any other lens(es) and/or combinations thereof. The one or more optical components 510 may have an optical axis 512.

The top microphone 515 and the side microphone 520 may include any or all features and/or characteristics described with respect to FIGS. 1-4B. For example, the top microphone 515 and the side microphone 520 may be microphones which may receive, sample, capture, and/or record audio data, such as sound waves which may be related to image or video data. For example, the audio data, cues, or commands may be associated with a virtual assistant system, voice-activated system or voice-enabled system. The top microphone 515 and the side microphone 520 are aligned in a plane of the body 505 and the plane is perpendicular to an optical axis 512 of the one or more optical components 510.

The processor 525 may include any or all features and/or characteristics described with respect to FIGS. 1-4B and may be a system-on-chip, image signal processor, a controller or combinations thereof. The processor 525 may collectively work with the one or more optical components 510, the top microphone 515, and the side microphone 520.

Operationally, the top microphone 515 and the side microphone 520 may capture side audio signals (may also be known as "audio channels") and top audio signals from a sound source 530. The processor 525 may process the captured top and side audio signals using beamforming techniques, such as for example, the beamforming techniques described in U.S. Pat. No. 10,122,956, issued on Nov. 6, 2018, to Jing et al., which is incorporated by reference in its entirety. Other beamforming techniques can be used without departing from the scope of the specification or claims.

The processor 525 processes the captured top and side audio signals using a set of tuned beamforming parameters. The tuned beamforming parameters apply a delay to the side audio signal and top audio signal associated with the orthogonality of the surfaces corresponding to the top microphone 515 and the side microphone 520. Applying the delay generates a first virtual microphone channel having a cardiod spatial response profile 517 and a second virtual microphone channel having a cardiod spatial response profile 522. As shown, audio signals from the audio source 530 are captured or picked up equally by the top microphone 515 and the side microphone 520 and is in line with an expected stereo audio with respect to the video or alternatively, the optical axis 512 of the one or more optical components 510. The virtual audio channels are an improved representation of the sound source 530 during stereo audio playback. The processor 525 combines the first virtual audio channel and the second virtual audio channel into an audio stream that is configured for stereo audio playback. The processor 525 outputs the audio stream.

Figure 6:
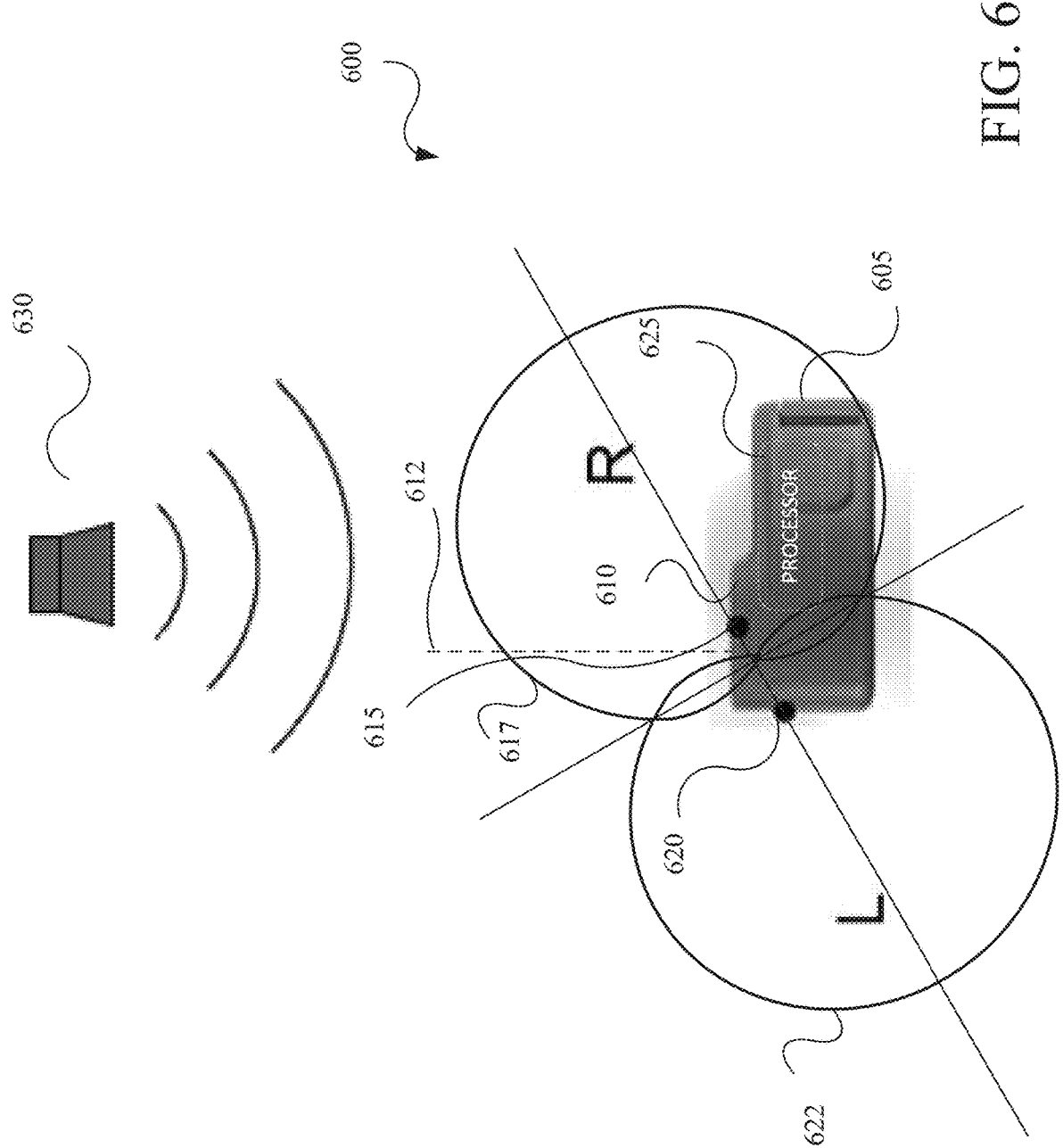
FIG. 6 is a top view of a block diagram of an example of an image capture device with optimal microphone placements and rear facing beamforming.

FIG. 6 is a top view of a block diagram of an example of an image capture device 600 with optimal microphone placements using the beamforming techniques described with respect to FIG. 5. The image capture device 600 includes one or more optical components 610 structured on the body 605, a front microphone 615 internal to and structured on the body 605, a side microphone 620 internal to and structured on the body 605, and a processor 625 internal to the body 605. The image capture device 600 may include any or all features and/or characteristics described with respect to FIGS. 1-4B. Although shown as a single element, in alternate embodiments, the number of each element may be varied without departing from the scope of the present disclosure.

The one or more optical components 610 may include any or all features and/or characteristics described with respect to FIGS. 1-4. For example, the one or more optical components 610 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, perspective control lenses, and/or any other lens(es) and/or combinations thereof. The one or more optical components 610 may have an optical axis 612.

The front microphone 615 and the side microphone 620 may include any or all features and/or characteristics described with respect to FIGS. 1-4B. For example, the front microphone 615 and the side microphone 620 may be microphones which may receive, sample, capture, and/or record audio data, such as sound waves which may be related to image or video data. For example, the audio data, cues, or commands may be associated with a virtual assistant system, voice-activated system or voice-enabled system. The front microphone 615 is on the same surface as the one or more optical components 610 and facing in the same direction that images or video may be captured by the one or more optical components 610. That is, the front microphone 615 is co-located with the one or more optical components 610. The front microphone 615 and the side microphone 620 are non-planar with respect to the body 605. In an implementation, a line intersecting the front microphone 615 and the side microphone 620 may be angularly offset from an optical axis 612 of the one or more optical components 610.

The processor 625 may include any or all features and/or characteristics described with respect to FIGS. 1-4B and may be a system-on-chip, image signal processor, a controller or combinations thereof. The processor 625 may collectively work with the one or more optical components 610, the front microphone 615, and the side microphone 620.

Operationally, the front microphone 615 and the side microphone 620 may capture side audio signals (may also be known as "audio channels") and front audio signals from an audio or sound source 630. The processor 625 may process the captured front and side audio signals using beamforming techniques, such as for example, the beamforming techniques described in U.S. Pat. No. 10,122,956, issued on Nov. 6, 2018, to Jing et al., which is incorporated by reference in its entirety. Other beamforming techniques can be used without departing from the scope of the specification or claims.

The processor 625 processes the captured front and side audio signals using a set of tuned beamforming parameters. The tuned beamforming parameters apply a delay to the side audio signal and front audio signal associated with the front microphone 615 and the side microphone 620. Applying the delay generates a first virtual microphone channel having a cardiod spatial response profile 617 and a second virtual microphone channel having a cardiod spatial response profile 622. As shown, audio signals from the audio source 630 are captured or picked up differently by the front microphone 615 and the side microphone 620. The audio signals from the sound source 630 are captured more strongly by the front microphone 615 than the side microphone 620 and as a result, the stereo audio is skewed relative to the video or alternatively, the optical axis 612 of the one or more optical components 610. For example, the cardiod spatial response profile 622 is rear facing whereas the cardiod spatial response profile 617 is front facing.

FIG. 7 is a top view of a block diagram of an example of an image capture device 700 with beamforming for optimal microphone placements for wind noise. The image capture device 700 includes one or more optical components 710 structured on the body 705, a front microphone 715 internal to and structured on the body 705, a side microphone 720 internal to and structured on the body 705, and a processor 725 internal to the body 705. The image capture device 700 may include any or all features and/or characteristics described with respect to FIGS. 1-4B. Although shown as a single element, in alternate embodiments, the number of each element may be varied without departing from the scope of the present disclosure.

The one or more optical components 710 may include any or all features and/or characteristics described with respect to FIGS. 1-4. For example, the one or more optical components 710 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, perspective control lenses, and/or any other lens(es) and/or combinations thereof. The one or more optical components 710 may have an optical axis 712.

The front microphone 715 and the side microphone 720 may include any or all features and/or characteristics described with respect to FIGS. 1-4B. For example, the front microphone 715 and the side microphone 720 may be microphones which may receive, sample, capture, and/or record audio data, such as sound waves which may be related to image or video data. For example, the audio data, cues, or commands may be associated with a virtual assistant system, voice-activated system or voice-enabled system. The front microphone 715 is on the same surface as the one or more optical components 710 and facing in the same direction that images or video may be captured by the one or more optical components 710. That is, the front microphone 715 is co-located with the one or more optical components 710. The front microphone 715 and the side microphone 720 are non-planar with respect to the body 705. In an implementation, a line intersecting the front microphone 715 and the side microphone 720 may be angularly offset from an optical axis 712 of the one or more optical components 710. In an implementation, wherein the the front microphone 715 and the side microphone 720 are relationally offset from an optical axis 712 of the one or more optical components 710. Although the description herein is with respect to the side microphone 720, the image capture device 700 can include or refer to other microphones on other surfaces and the description herein may be adapted accordingly without departing from the scope of the claims or specification.

The processor 725 may include any or all features and/or characteristics described with respect to FIGS. 1-4B and may be a system-on-chip, image signal processor, a controller or combinations thereof. The processor 725 may collectively work with the one or more optical components 710, the front microphone 715, and the side microphone 720 to perform beamforming for wind noise optimized microphone placements.

Operationally, the front microphone 715 and the side microphone 720 may capture side audio signals (may also be known as "audio channels") and front audio signals from an audio or sound source 730. The processor 725 may process the captured front audio signal using beamforming techniques, such as for example, the beamforming techniques described in U.S. Pat. No. 10,122,956, issued on Nov. 6, 2018, to Jing et al., which is incorporated by reference in its entirety, and may process the captured side audio signal using the beamforming techniques described herein.

In an implementation, for the front microphone 715, the processor 725 processes the captured front and side audio signals using a set of tuned beamforming parameters which account for placement, surface effects, and like conditions. The tuned beamforming parameters apply a delay to the side audio signal and front audio signal associated with the front microphone 715 and the side microphone 720. Applying the delay generates a first virtual microphone channel having a cardiod spatial response profile 717. For the side microphone 720, the processor 725 processes the captured side audio signal using a set of tuned beamforming parameters. The tuned beamforming parameters apply a delay to the side audio signal associated with the side microphone microphone 720. Applying the delay generates a second virtual microphone channel having an omni response profile 722. As shown, although the audio signals from the audio source 730 are captured or picked up differently by the front microphone 715 and the side microphone 720, by beamforming using only the side audio signal to generate the omni response profile 722, the rear facing profile as shown in FIG. 6 is mitigated and the expected stereo audio is better aligned with the video or alternatively, the optical axis 712 of the one or more optical components 710. In an implementation, the tuned beamforming parameters for the side microphone 720 leverage body 705 shadowing effects to provide additional separation between the front microphone 715 and the side microphone 720. In an implementation, the shadowing effects are particularly apparent for higher frequencies as the higher frequencies undergo greater attenuation than lower frequencies.

In an implementation, for the front microphone 715, the processor 725 processes the captured front and side audio signals using a set of tuned beamforming parameters. The tuned beamforming parameters apply a delay to the side audio signal and front audio signal associated with the front microphone 715 and the side microphone 720. Applying the delay generates a first virtual microphone channel having a cardiod spatial response profile 717. For the side microphone 720, for the front microphone 715, the processor 725 processes the captured front and side audio signals using a set of tuned beamforming parameters. The tuned beamforming parameters foregoes application of delays, which is also referred to as broadside beamforming, and appropriately attenuates the signals to form a second virtual microphone channel having a non-rear facing response profile. In an implementation, the tuned beamforming parameters leverage body 705 shadowing effects to provide additional separation between the front microphone 715 and the side microphone 720. In an implementation, the shadowing effects are particularly apparent for higher frequencies as the higher frequencies undergo greater attenuation than lower frequencies.

FIG. 8 is a flowchart showing an example of a technique 800 for beamforming for wind noise optimized microphone placements. The technique 800 includes providing 810 microphones including a front facing microphone on an image capture device; receiving 820 audio signals from the microphones; generating 830 a forward facing beam for the front microphone from the received audio signals; generating 840 an omni beam for each non-front microphone from an associated received audio signal; and outputting 850 processed audio signals.

The technique 800 includes providing 810 microphones including a front facing microphone on an image capture device. An image capture device includes a plurality of microphones including a front facing microphone as described herein and at least one non-front facing microphone. In an implementation, the at least one non-front facing microphone may be a side microphone. In an implementation, the at least one non-front facing microphone may be a top microphone.

The technique 800 includes receiving 820 audio signals from the microphones. Each of the plurality of microphones may receive, sample, capture, and/or record audio data, such as sound waves which may be related to image or video data.

The technique 800 includes generating 830 a forward facing beam or signal for the front microphone from the received audio signals. In an implementation, the forward facing beam is generated from the audio signals captured by the front facing microphone and non-front facing microphones. In an implementation, tuned beamforming parameters are applied to the audio signals captured by the front facing microphone and non-front facing microphones. In an implementation, the forward facing beam is a forward facing cardiod pattern.

The technique 800 includes generating 840 an omni beam(s) or signals for non-front microphones from an associated received audio signal. In an implementation, the omni beam is generated from the audio signal captured by the non-front facing microphone. In an implementation, tuned beamforming parameters are applied to the audio signals captured by the non-front facing microphone.

The technique 800 includes outputting 850 processed audio signals. An output audio signal is generated from combining the forward facing beam and the omni beam.

FIG. 9 is a flowchart showing an example of a technique 900 for beamforming for wind noise optimized microphone placements. The technique 900 includes providing 910 microphones including a front facing microphone on an image capture device; receiving 920 audio signals from the microphones; generating 930 a forward facing beam for the front microphone from the received audio signals; generating 940 a non-rear facing beam for each non-front microphone from appropriate received audio signals; and outputting 950 processed audio signals.

The technique 900 includes providing 910 microphones including a front facing microphone on an image capture device. An image capture device includes a plurality of microphones including a front facing microphone as described herein and at least one non-front facing microphone. In an implementation, the at least one non-front facing microphone may be a side microphone. In an implementation, the at least one non-front facing microphone may be a top microphone.

The technique 900 includes receiving 920 audio signals from the microphones. Each of the plurality of microphones may receive, sample, capture, and/or record audio data, such as sound waves which may be related to image or video data.

The technique 900 includes generating 930 a forward facing beam or signal for the front microphone from the received audio signals. In an implementation, the forward facing beam is generated from the audio signals captured by the front facing microphone and non-front facing microphones. In an implementation, tuned beamforming parameters are applied to the audio signals captured by the front facing microphone and non-front facing microphones. In an implementation, the forward facing beam is a forward facing cardiod pattern.

The technique 900 includes generating 940 a non-rear facing beam or signal for each non-front microphone from appropriate received audio signals. In an implementation, the non-rear facing beam is generated from the appropriate audio signals captured by the front facing microphone and the non-front facing microphone. In an implementation, tuned beamforming parameters are applied to the audio signals captured by the front facing microphone and the non-front facing microphone without application of delay processing. In an implementation, broadside beamforming using the tuned beamforming parameters is applied to the audio signals captured by the front facing microphone and the non-front facing microphone.

The technique 900 includes outputting 950 processed audio signals. An output audio signal is generated from combining the forward facing beam and the non-rear facing beam.

Figure 10:
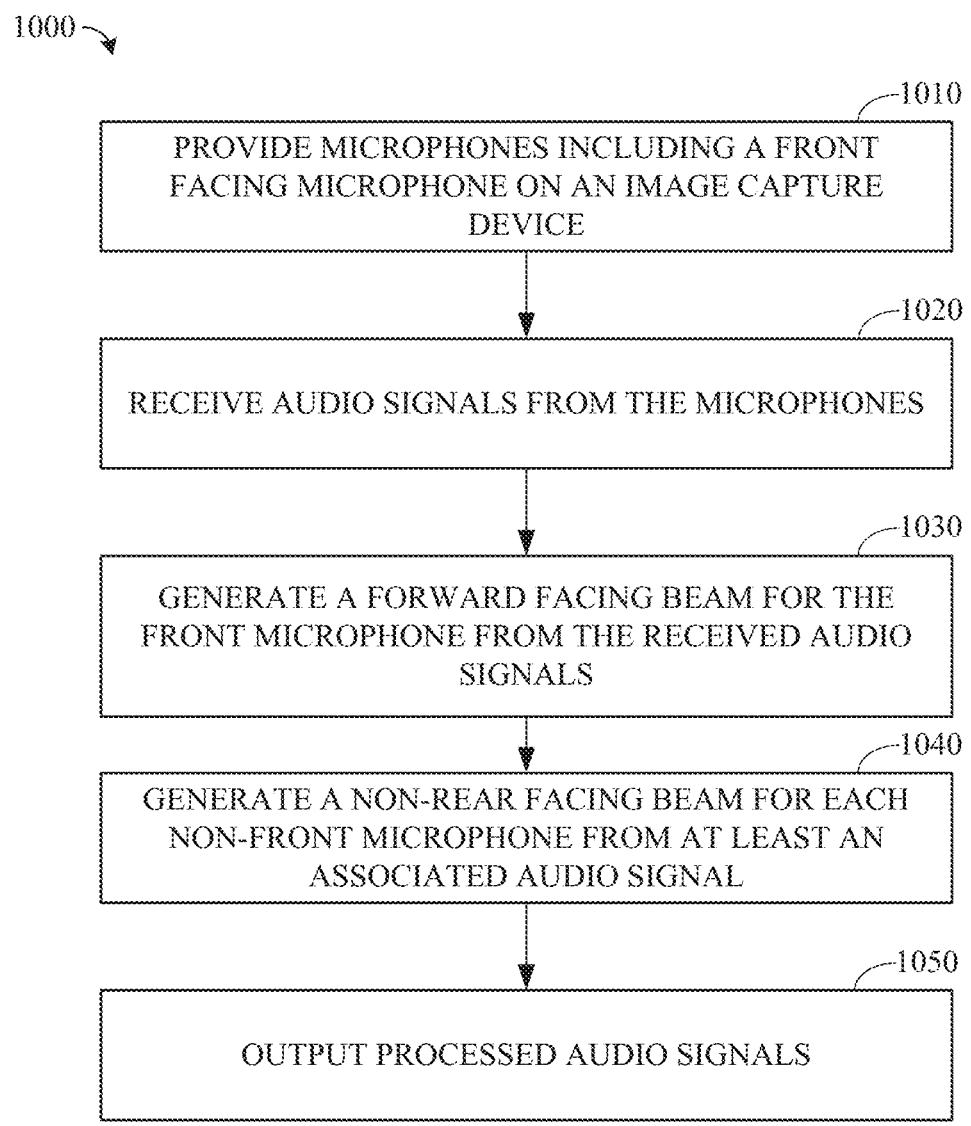
FIG. 10 is a flowchart showing an example of a technique for beamforming for wind noise optimized microphone placements.

FIG. 10 is a flowchart showing an example of a technique 1000 for beamforming for wind noise optimized microphone placements. The technique 1000 includes providing 1010 microphones including a front facing microphone on an image capture device; receiving 1020 audio signals from the microphones; generating 1030 a forward facing beam for the front microphone from the received audio signals; generating 1040 a non-rear facing beam for each non-front microphone from at least an associated received audio signal; and outputting 1050 processed audio signals.

The technique 1000 includes providing 1010 microphones including a front facing microphone on an image capture device. An image capture device includes a plurality of microphones including a front facing microphone as described herein and at least one non-front facing microphone. In an implementation, the at least one non-front facing microphone may be a side microphone. In an implementation, the at least one non-front facing microphone may be a top microphone.

The technique 1000 includes receiving 1020 audio signals from the microphones. Each of the plurality of microphones may receive, sample, capture, and/or record audio data, such as sound waves which may be related to image or video data.

The technique 1000 includes generating 1030 a forward facing beam or signal for the front microphone from the received audio signals. In an implementation, the forward facing beam is generated from the audio signals captured by the front facing microphone and non-front facing microphones. In an implementation, tuned beamforming parameters are applied to the audio signals captured by the front facing microphone and non-front facing microphones. In an implementation, the forward facing beam is a forward facing cardiod pattern.

The technique 1000 includes generating 1040 a non-rear facing beam or signal for each non-front microphone from at least an associated received audio signal. In an implementation, an omni beam is generated from the at least an associated received audio signal captured by the non-front facing microphone. Tuned beamforming parameters are applied to the at least an associated received audio signal captured by the non-front facing microphone. In an implementation, the at least an associated received audio signal are appropriate audio signals captured by the front facing microphone and the non-front facing microphone. In an implementation, tuned beamforming parameters are applied to the appropriate audio signals captured by the front facing microphone and the non-front facing microphone without application of delay processing. In an implementation, broadside beamforming using the tuned beamforming parameters is applied to are appropriate audio signals captured by the front facing microphone and the non-front facing microphone The technique 1000 includes outputting 1050 processed audio signals. An output audio signal is generated from combining the forward facing beam and the non-rear facing beam.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
a microphone configured to capture an audio signal;
another microphone configured to capture another audio signal; and
a processor configured to:
generate a first beam based on the audio signal captured by the microphone and the other audio signal captured by the other microphone,
wherein the first beam is co-oriented with at least one optical component,
wherein beamforming parameters are applied to the audio signal captured by the microphone, and
wherein the beamforming parameters account for body shadowing effects;
generate a second beam based on the other audio signal captured by the other microphone; and
output an output audio signal based on the first beam and the second beam.

2. The device of claim 1, wherein the other microphone is a side microphone.

3. The device of claim 1, wherein the other microphone is a top microphone.

4. The device of claim 3, wherein the microphone and the least another microphone are angularly offset from an optical axis of the at least one optical component.

5. The device of claim 1, wherein the beamforming parameters account for delay effects.

6. The device of claim 1, wherein to generate the second beam, the processor is further configured to:
apply beamforming parameters to the other audio signal captured by the other microphone.

7. The device of claim 6, wherein the second beam is an omni beam.

8. The device of claim 7, wherein the microphone and the other microphone are relationally offset from an optical axis of the at least one optical component.

9. The device of claim 1, wherein the second beam is generated based on the audio signal captured by the microphone and the other audio signal captured by the other microphone.

10. The device of claim 9, wherein to generate the second beam, the processor is further configured to:
apply beamforming parameters to the audio signal captured by the microphone and the other audio signal captured by the other microphone.

11. The device of claim 10, wherein the second beam is a cardioid beam.

12. A method for beamforming for wind noise optimized microphone placements, the method comprising:
generating a first beam based on an audio signal captured by a microphone on an image capture device and an audio signal captured by at least another microphone on the image capture device,
wherein the first beam is co-oriented with at least one optical component;
wherein beamforming parameters are applied to the audio signal captured by the microphone, and
wherein the beamforming parameters account for body shadowing effects;
generating a second beam based on the audio signal captured by at least the at least another microphone; and
outputting an output audio signal based on the first beam and the second beam.

13. The method of claim 12, wherein the at least another microphone is a side microphone.

14. The method of claim 13, wherein the microphone and the least another microphone are relationally offset from an optical axis of the at least one optical component.

15. The method of claim 12, wherein the beamforming parameters account for delay effects.

16. The method of claim 12, wherein the generating a second beam further comprises:
applying beamforming parameters to the audio signal captured by the at least another microphone.

17. The method of claim 12, wherein the second beam is generated based on the audio signal captured by the microphone and the audio signal captured by at least the at least another microphone.

18. The method of claim 17, wherein the generating the first beam further comprises:

applying beamforming parameters to the audio signal captured by the microphone and the audio signal captured by the at least another microphone.

19. The method of claim 18, wherein the microphone and the least another microphone are angularly offset from an optical axis of the at least one optical component.

20. An image capture device comprising:
a microphone configured to capture an audio signal;
another microphone configured to capture another audio signal; and
a processor configured to:
  generate an audio source facing beam based on the audio signal captured by the microphone and the other audio signal captured by the other microphone, wherein the audio source facing beam is co-oriented with at least one optical component;
  beamforming parameters are applied to the audio signal captured by the microphone, and wherein the beamforming parameters account for body shadowing effects;
  generate an audio source leaning beam using the other audio signal captured by the other microphone; and
  output an output audio signal based on the audio source facing beam and the audio source leaning beam.

* * * * *